(12) United States Patent
Lawson

(10) Patent No.: US 6,616,159 B2
(45) Date of Patent: Sep. 9, 2003

(54) INTEGRATED REAR WHEEL SUSPENSION SYSTEM

(75) Inventor: Robert Christian Lawson, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/862,250

(22) Filed: May 22, 2001

(65) Prior Publication Data

US 2002/0175487 A1 Nov. 28, 2002

(51) Int. Cl.⁷ .................................................. B60G 3/04
(52) U.S. Cl. ........................ 280/124.135; 280/124.171
(58) Field of Search .................... 280/124.135, 124.134, 280/124.14, 124.17, 124.171, 124.174, 124.131; 267/246, 36.1

(56) References Cited

U.S. PATENT DOCUMENTS

| | | | | |
|---|---|---|---|---|
| 2,402,562 A | * | 6/1946 | Lewis | 180/254 |
| 3,601,425 A | * | 8/1971 | Sampietro et al. | 280/124.166 |
| 3,603,422 A | * | 9/1971 | Cordiano | 180/359 |
| 4,854,606 A | * | 8/1989 | de Goncourt et al. | 280/124.14 |
| 4,887,841 A | * | 12/1989 | Cowburn et al. | 280/124.109 |
| 4,982,978 A | * | 1/1991 | Kawasaki | 280/124.109 |
| 5,181,736 A | * | 1/1993 | Kokubun | 280/124.109 |
| 5,380,036 A | * | 1/1995 | Perkins et al. | 280/124.106 |
| 6,029,987 A | * | 2/2000 | Hoffman et al. | 280/124.171 |
| 6,189,904 B1 | * | 2/2001 | Gentry et al. | 280/124.175 |
| 6,357,772 B1 | * | 3/2002 | Pelz et al. | 280/124.134 |
| 2002/0113394 A1 | * | 8/2002 | Ziech et al. | 280/124.109 |

FOREIGN PATENT DOCUMENTS

| | | |
|---|---|---|
| EP | 0 994 270 A2 | 4/2000 |
| EP | 0 994 207 A3 | 4/2001 |
| GB | 2 154 520 A | 9/1985 |
| GB | 2 367 876 A | 4/2002 |

* cited by examiner

*Primary Examiner*—Paul N. Dickson
*Assistant Examiner*—Laura B. Rosenberg
(74) *Attorney, Agent, or Firm*—John Kajander

(57) ABSTRACT

A rear wheel suspension system replaces the lower control arms, upper control arms, coil springs, and anti-roll bar assembly in the prior art with a simple composite member. By carefully designing the shape of the beam, the material system and the pivot locations, the ride and roll rates and camber and toe characteristics of the original prior art suspension system can be preserved.

9 Claims, 3 Drawing Sheets

INTEGRATED REAR WHEEL SUSPENSION SYSTEM

TECHNICAL FIELD

The present invention relates generally to wheel suspension systems for motor vehicles, and more particularly, to an integrated rear wheel suspension system.

BACKGROUND ART

A suspension system on an automobile works with the tires, frame or unit body, wheels, wheel bearings, brake system, and steering system to provide a safe and comfortable mode of transportation. A suspension system has several important functions, including supporting the various components of an automobile, allowing the tires to move up and down to provide a comfortable ride, allowing for rapid cornering without extreme body roll, keeping the tires on the road surface, preventing excessive body squat when accelerating, preventing excessive body dive when braking, allowing the front wheels to turn side-to-side for steering, and, in combination with the steering system, keeping the wheels in correct alignment.

These suspension systems use front and rear springs to suspend a vehicle's frame, body or unitized body, engine, and powertrain above the wheels. These relatively heavy assemblies constitute what is known as "sprung" weight. The "unsprung" weight, on the other hand, includes wheels and tires, brake assemblies, and other structural members not supported by the springs. Unfortunately, high "unsprung" weight may result in adverse vehicle characteristics. Reduction of "unsprung" weight, therefore, is desirable.

Many front and rear suspension systems incorporate compression type coil springs. Some front and rear coil springs are mounted between a lower control arm and spring housing or seat in the vehicle frame or body. Coil springs are made of steel or steel alloy and may have evenly or variably spaced coils to provide adequate durability and vehicle stability under all intended load conditions. Unfortunately, compression type coil springs are typically heavy and require significant packaging space within the vehicle.

When coil springs are used in a front or rear suspensions, three or four linkages are typically placed between the wheel axles and the frame. These linkages support driving and braking torque, the vertical load due to road loads, and cornering (lateral) loads. The lower control arms pivot in the frame members and sometimes support the rear coil springs to provide for up and down movement of the axle and wheel assembly. Unfortunately, these linkages increase the amount of "unsprung" weight, while increasing overall part count and complexity.

In addition, an anti-roll bar is usually attached from the rear suspension lower control arm to the frame side rail to prevent side sway (roll motion) of the body. Unfortunately, anti-roll bars are typically heavy and require significant packaging space within a vehicle. In addition, anti-roll bars increase the overall part count and complexity of suspension systems.

The disadvantages associated with these conventional rear suspension techniques have made it apparent that a new technique for rear suspension is needed. The new technique should integrate multiple automotive suspension functions into one integral unit. Additionally, the new technique should reduce part count and weight while potentially improving noise, vibration and harshness (NVH) and reducing complexity. The present invention is directed to these ends.

SUMMARY OF THE INVENTION

It is, therefore, an object of the invention to provide an improved and reliable integrated rear wheel suspension system. Another object of the invention is to reduce part count, system weight, and system complexity, while potentially improving NVH.

In accordance with the objects of this invention, an integrated rear wheel suspension system is provided. In one embodiment of the invention, a rear wheel suspension system replaces the lower control arms, upper control arms, coil springs, and anti-roll bar assembly in the prior art with a composite member. By carefully designing the shape of the beam, the material system and the pivot locations, the ride and roll rates (stiffness) and camber and toe characteristics of the original prior art suspension system can be preserved.

The present invention thus achieves an improved integrated rear wheel suspension system. The present invention is advantageous in that it integrates multiple automotive suspension functions into one integral unit.

Additional advantages and features of the present invention will become apparent from the description that follows, and may be realized by the number of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
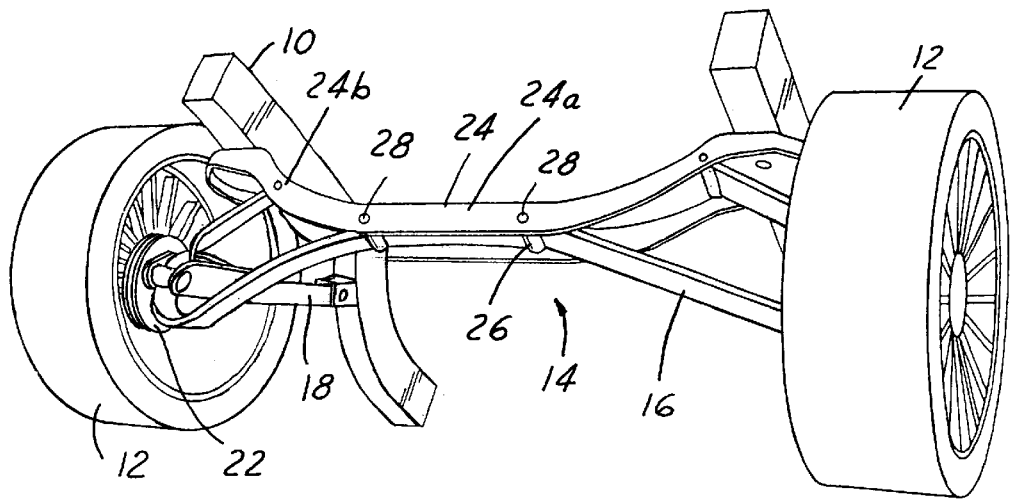
FIG. 1 is an illustration of an integrated rear wheel suspension system in accordance with one embodiment of the present invention.

In the following figures, the same reference numerals will be used to identify identical components in the various views. The present invention is illustrated with respect to an integrated rear wheel suspension system, particularly suited for the automotive field. However, the present invention is applicable to various other uses that may require rear wheel suspension systems.

Referring to FIG. 1, an integrated rear wheel suspension system 14 in accordance with one embodiment of the present invention is illustrated. A motor vehicle chassis 10 (or unitized body and chassis) is supported on left and right road wheels 12 by the integrated rear wheel suspension system 14. The wheel suspension system 14 includes a composite member 16, a pair of trailing links 18 and a pair of wheel support members 22.

The composite member 16 is preferably composed of a fiber-reinforced thermoset or thermoplastic polymer material. Preferably, the polymer used in the composite is an epoxy resin. The method for making the composite member is described below in FIG. 5.

Figure 2:
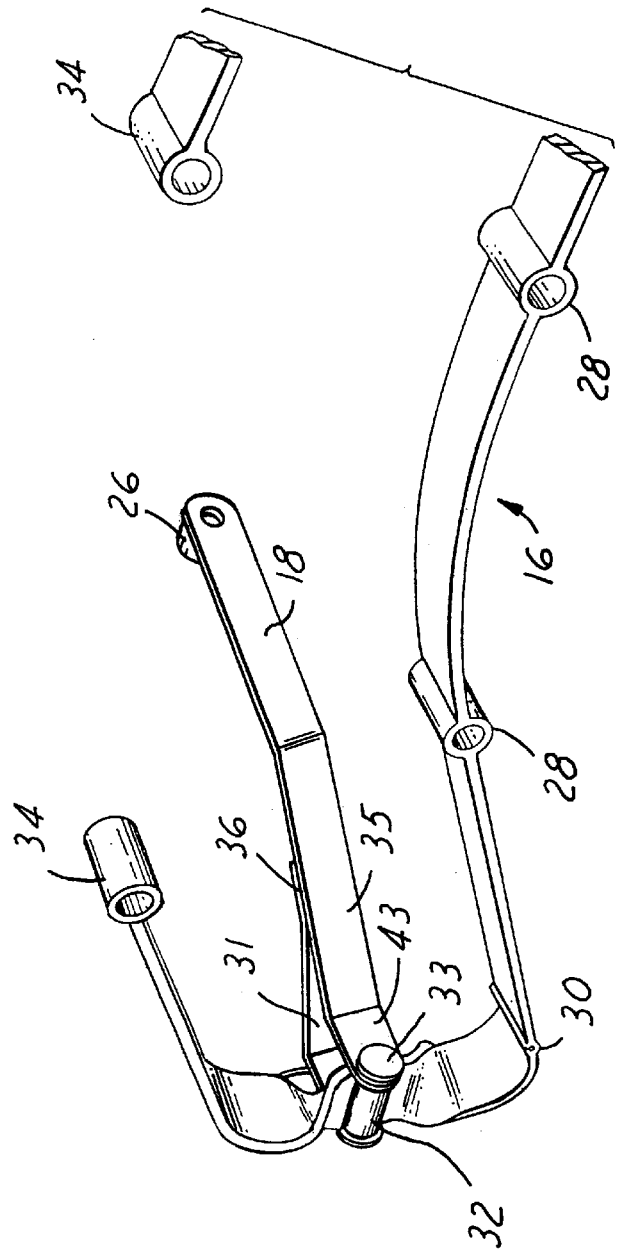
FIG. 2 is an illustration of a composite member and a trailing link in accordance with one embodiment of the present invention.

As best seen in FIG. 2, the composite member 16 in accordance with one preferred embodiment of the present invention is shown attached to the trailing arm 18. Preferably, the composite member 16 has a pair of upper attachment members 34, a pair of hub attachment members 32, a pair of additional attachment members 30, and a pair of inner attachment members 28. The upper attachment members 34 are provided above hub attachment members 32 to pivotally connect the composite member 16 to an outer portion 24b of the chassis cross-member 24, thereby replacing a conventional upper control arm. The inner attachment members 28 are provided to pivotally connect the composite member 16 to the inner portion 24a of the chassis cross-member 24. The additional attachment members 30 are provided on the composite member 16 to mount a damper (shock) to the body (not shown).

Each trailing link 18 consists of a rear flange piece 31 and a main flange piece 35 coupled at a first location 36. Preferably, the rear flange piece 31 and main flange piece 35 are irreversibly coupled together by welding or some other similar technique known in the art. The main flange 35 has a front annulus 26 for pivotally connecting to an inner portion 24a of the chassis cross-member 24 and a rear annulus 43 for attaching the trailing link 18 to the composite member 16. The rear flange 31 also has an annulus 45 for attaching the trailing link 18 to the composite member 16.

Figure 3:
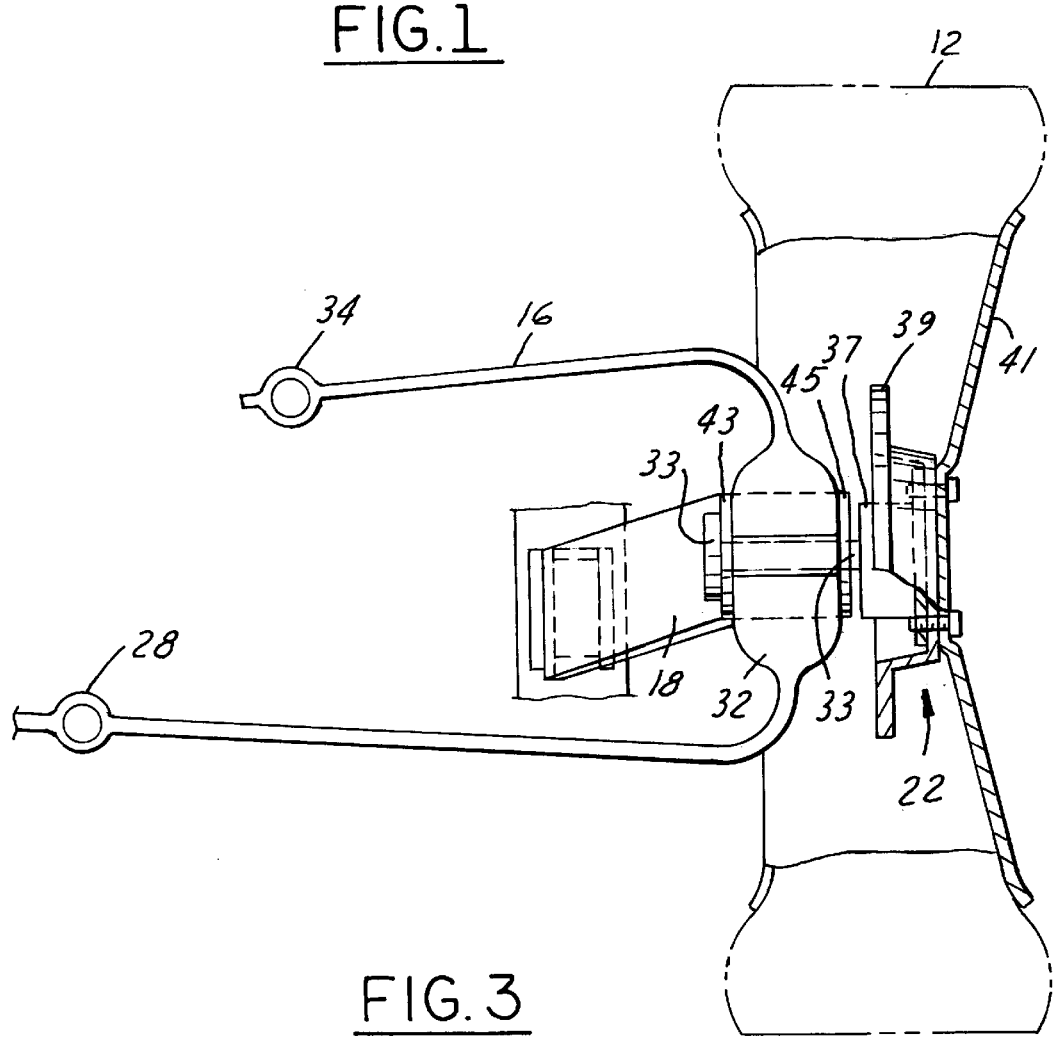
FIG. 3 is a close-up view of a portion of FIG. 1 emphasizing the coupling of the composite member to the wheel assembly.
Figure 4:
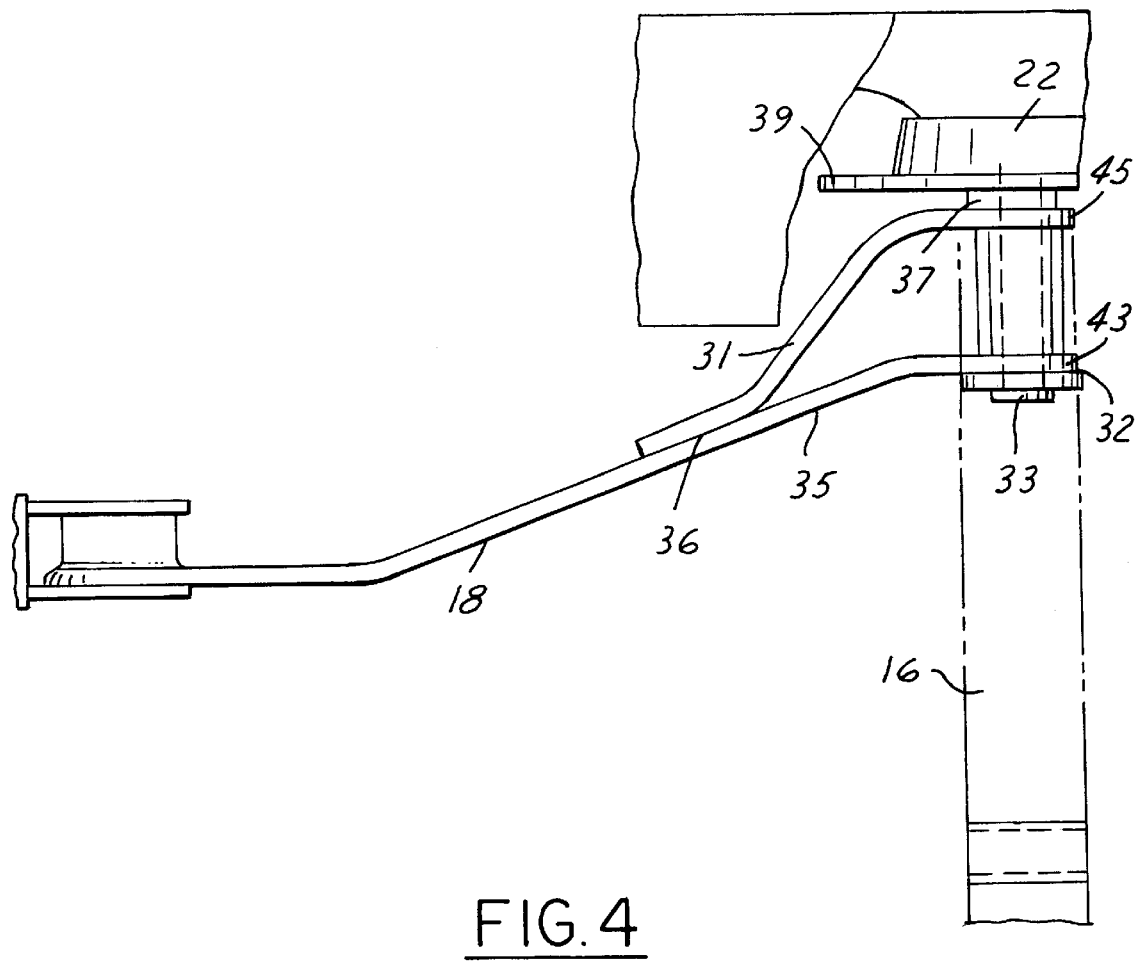
FIG. 4 is a close-up view of a portion of FIG. 1 emphasizing the coupling of the trailing link to the wheel assembly.

As best shown in FIGS. 3 and 4, a spindle 33 extending through hub attachment members 32 of the composite member 16 and the annulus 43, 45 of each trailing link 18 is preferably used to connect each hub 37 of the wheel assembly 22 to the composite member 16 and trailing link 18. Of course, other attachment methods known in the art are contemplated. Also shown on the wheel assembly 22 are a brake rotor 39 and the rim 41. In alternative embodiments, a brake caliper (not shown) may be mounted to the composite member 16 or to the trailing arm 18 and to the brake rotor 39. Each wheel support members 22 is also rotatably mounted to one of a pair of road wheels 12 and secured with the rim 41 in a method well known in the art. While not shown, rubber bushings or similar material are preferably contained between the mating portions of the composite member 16, trailing links 18, and the chassis cross-member 24.

The present invention allows the trailing link 18 to locate the wheel assembly 22 axis fore/aft, while the composite member 16 provides camber and toe control. Both the trailing link 18 and the composite member 16 react to the braking torque. Due to the trailing link 18 suspension design, the axis moves along an arc as viewed in the side view. The hub attachment members 32 on the composite member 16 must also follow an arc. The composite beam 16 must flex both vertically and fore/aft.

Figure 5:
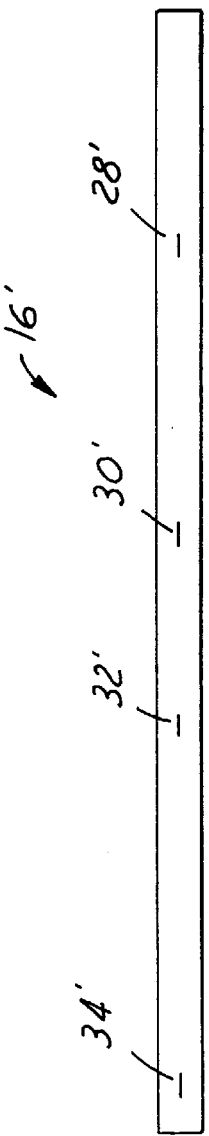
FIG. 5 is a cross section of a 3D woven preform for a composite member in accordance with one embodiment of the present invention.

Referring to FIG. 5, a cross section of a 3D woven preform part 16' for a composite member 16 in accordance with one embodiment of the present invention is illustrated. In this process, multiple spools of fiber (preferably glass and/or carbon fibers) feed fiber into a weaving machine that loops the fiber across the width and through the thickness, with a majority of the fibers running along the length of the composite member preform. A curable resin, preferably an epoxy resin, is added to the weaving to bind the fibers into a preform. The initial preform would be approximately 2 m wide and may be manufactured using a 3D textile weaving process. Approximately 75 mm of the initial preform would be cut off for each part 16'. The preform 16' would then be twisted in the regions corresponding to the lower and upper ball joints. Sacrificial inserts would be placed into the preform slits, corresponding to upper inner pivot 34', hub 32', damper 30' and inner pivot 28', thereby expanding them into holes that are used to form attachment members 34, 32, 30 and 28 respectively. This preform 16' could then be placed in a mold and consolidated with resin using a resin transfer molding (RTM) or vacuum assisted resin transfer molding (VARTM) process.

Several variations of this design can be created. 1) If the vehicle is front wheel drive and is very light, and the fore/aft stiffness is sufficient, and the brake calipers (not shown) can be mounted to the composite member 16, then no further components are needed. 2) If the vehicle is front wheel drive and additional fore/aft stiffness is required, then trailing links 18 may be added to the system. Brake calipers might then be mounted on the trailing link 18, simplifying the composite piece. In all cases, carbon fiber can be strategically woven into the preform 16' to add stiffness where it is needed. Ride and roll stiffness can be independently controlled by varying the thickness, orientations, and preform fiber distribution throughout the part.

The present invention thus achieves an improved integrated rear wheel suspension system 14 by using a composite member 16. The single composite member 16 thus replaces the lower control arms, upper control arms, coil springs, and anti-roll bar assembly that are found in the prior art rear suspension systems. By carefully designing the shape of the beam 16, the material system and the pivot locations, the ride and roll rates and camber and toe characteristics of the original prior art suspension system can be preserved. Further, the rear wheel suspension system 14 has potential to reduce weight, complexity and cost of prior art suspension systems while potentially improving NVH and reducing overall complexity.

It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A rear wheel suspension for a vehicle comprising:
   a chassis;
   a pair of wheel support members for rotatably mounting a pair of road wheels;
   a chassis cross-member coupled to said chassis; and
   a composite member having upper attachment members, hub attachment members, additional attachment members, and inner attachment members, said upper attachment members rotatably coupled to a first portion of said chassis cross-member, said hub attachment members coupled to said wheel support members, said additional attachment members rotatably coupled to each of said pair of wheel support members, and said inner attachment members rotatably coupled to a second portion of said chassis cross-member, wherein said composite member controls a toe in of said pair of road wheels.

2. The rear wheel suspension for a vehicle as recited in claim 1, further comprising a pair of trailing links, each of said trailing links is rotatably coupled to one of said hub attachment members and to said chassis cross-member.

3. The rear wheel suspension for a vehicle as recited in claim 1, wherein said vehicle is front wheel drive.

4. The rear wheel suspension for a vehicle as recited in claim 3, further comprising a pair of trailing links, each of said trailing links is rotatably coupled to one of said hub attachment members and to said chassis cross-member, said pair of trailing links being necessary to provide additional fore/aft stiffness.

5. The rear wheel suspension tar a vehicle as recited in claim 1, wherein each of said hub attachment members is located between a respective one of said inner attachment members and a respective of said upper attachment members along said composite member.

6. A rear wheel suspension for use on rear wheel drive vehicle or on a front-wheel drive vehicle in which fore/aft stiffness is required comprising;
   a chassis;
   a pair of wheel support members for rotatably mounting a pair of road wheels;
   a chassis cross-member coupled to said chassis;
   a composite member having upper attachment members, hub attachment members, additional attachment members, and inner attachment members, said upper attachment members rotatably coupled to a first portion of said chassis cross-member, said hub attachment members coupled to said wheel support members, said additional attachment members rotatably coupled to each of said pair of wheel support members, and said inner attachment members rotatably coupled to a second portion of said chassis cross-member, wherein said composite member controls a toe in of said pair of road wheels; and
   a pair of trailing links, each of said trailing links is rotatably coupled to one of said hub attachment members and to said chassis cross-member.

7. The rear wheel suspension for a vehicle as recited in claim 6, therein each of said hub attachment members is located between a respective one of said inner attachment members and a respective of said upper attachment members along said composite member.

8. A method for decreasing part count and complexity in a rear wheel suspension while improving noise, vibration and harshness and reducing weight, the method comprising:
   rotatably coupling each of a pair of upper attachment members of a composite member to a first portion of a chassis cross-member of the rear wheel suspension;
   pivotally coupling a front annulus of a main flange piece of said a trailing link to said chassis cross-member;
   coupling a rear annulus of said main flange piece to a hub attachment member of said composite member;
   coupling an annulus of a rear flange of said trailing link to said hub attachment member;
   coupling a wheel support member to said trailing link and said composite member by inserting a spindle through said rear annulus, said hub attachment member, and said annulus and securing said spindle to a hub rotatably coupling each of a pair of additional attachment members to a respective one of said wheel support members; and
   coupling each of a pair of inner attachment members to a second portion of said chassis cross-member.

9. The method of claim 8, each of said hub attachment members is located between a respective one of said inner attachment members and a respective of said upper attachment members along said composite member.

* * * * *